May 9, 1961 L. A. RUNTON 2,983,636
LAMINATED NON-WOVEN BELT
Filed Jan. 16, 1957
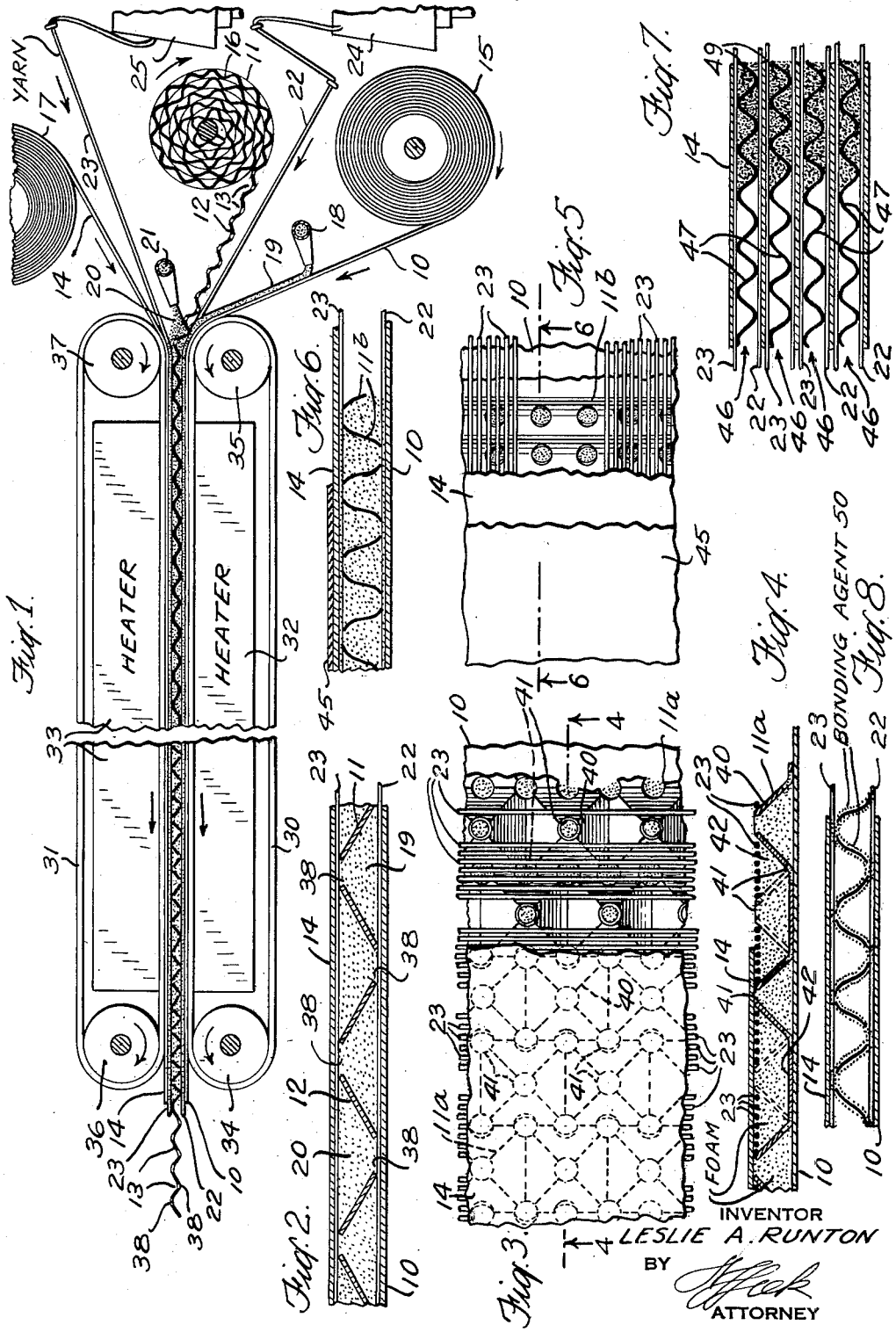
INVENTOR
LESLIE A. RUNTON
BY
ATTORNEY

United States Patent Office

2,983,636
Patented May 9, 1961

2,983,636

LAMINATED NON-WOVEN BELT

Leslie A. Runton, Middle Haddam, Conn., assignor to The Russell Manufacturing Company, Middletown, Conn., a corporation of Connecticut Filed Jan. 16, 1957, Ser. No. 634,518

3 Claims. (Cl. 154—52.1)

This invention relates to conveyor belts and has for an object to provide a belt composed of layers of non-woven paper-like material and having novel and improved characteristics.

Another object is to provide a belt of the above type having improved longitudinal strength and transverse bending characteristics.

Various other objects and advantages will be apparent as the nature of the invention is more fully disclosed.

In accordance with the present invention the belt is composed of layers of a paper or paper-like material such as kraft paper, matted or felted fibers, natural or synthetic film such as rubber or regenerated cellulose or paper coated with a film of such material, or other non-woven webs having a substantial tear strength.

The outer layers at least are formed of flat or creped sheets of such material and at least some of the intermediate layers are crimped or knurled to provide body for the belt and to facilitate the deformation of the layers as the belt bends or flexes in passing around rolls or pulleys.

The layers are bonded together by a bonding agent having flexing characteritsics such as polyurethane foam, vinyl foam, sponge rubber (natural or synthetic) or polyethylene or other bonding resins.

Layers of yarn or cord having a modulus of elasticity at least as low as that of the paper-like material and having high tensile strength may be embedded in the bonding agent between the layers of paper-like material for added longitudinal strength. Such yarn may be composed of glass fibers, high tensile cellulosic materials such as Fortisan, Dacron, cotton, wool, resin-coated and twisted paper of the type known as kraftcord, nylon or the like, depending upon the type of material used in forming the laminations.

The nature of the invention will be better understood by refering to the following description, taken in connection with the accompanying drawing in which certain specific embodiments thereof are set forth for purposes of illustration.

In the drawing,

Fig. 1 is a diagrammatic view illustrating a method of forming the belting;

Fig. 2 is an enlarged longitudinal section through the belting of Fig. 1;

Fig. 3 is a broken plan view of a belting having a knurled or embossed inner layer;

Fig. 4 is a transverse section taken on the line 4—4 of Fig. 3;

Fig. 5 is a broken elevation of a laminated and bonded belting having a rubber or rubber-like surface coating;

Fig. 6 is a section taken on the line 6—6 of Fig. 5;

Fig. 7 is a sectional view of a multi-ply belting having a plurality of crimped or fluted layers; and Fig. 8 is a section similar to Fig. 4 showing another embodiment wherein the foam is omitted and the various layers are bonded by a coating material.

Referring to the drawing more in detail, Fig. 1 shows a method of making a laminated belt composed of a lower web of paper or paper-like material 10 which may be flat or creped, an intermediate web 11 of crimped, fluted, knurled or corrugated paper-like material, shown in Fig. 1 as having transverse corrugations of wave-like form with transverse ridges 12 and valleys 13 as seen from above, and an upper web 14 of flat or creped paper-like material.

The layers 10, 11 and 14 are taken from reels 15, 16 and 17, respectively.

A bonding agent such as polyurethane foam or foam or sponge rubber, natural or synthetic, as above set forth, is applied from nozzle 18 to form a layer 19 on the web 10. A similar layer 20 of bonding agent is disposed on the intermediate web 11 from a nozzle 21.

Reinforcing yarns 22 and 23 taken from creels 24 and 25, respectively, are laid between the webs 10 and 11 and between the webs 11 and 14 to be embedded in and bonded by the layers 19 and 20 of foam.

The superimposed webs 10, 11, 14, yarns 22 and 23, and coatings 19 and 20 are fed between conveyor belts 30 and 31 between curing ovens 32 and 33 which supply heat for curing the foam or vulcanizing the rubber as the case may be. The belt 30 is fed around rolls 34 and 35 and the belt 31 is fed around rolls 36 and 37 which are spaced to guide the respective belts and to determine the thickness of the foam layers.

The ridges 12 and valleys 13 of the corrugated web 11 may be provided with holes 38 to permit the free flow of the bonding agent during the forming and curing operation.

In a specific embodiment the webs 10, 11 and 14 may be composed of paper such as kraft paper, the bonding agent may comprise polyurethane foam and the reinforcing cords may be made of Fortisan yarn. The Fortisan yarn has a low modulus of elasticity and is dimensionally stable with a high tensile strength. The reinforced composite structure thus has a tensile strength suited for light duty conveyor purposes.

The sponge or foam layers, in addition to bonding the webs and yarns together, provides resilience for the flexing of the belting around rolls. During such flexing corrugated web 11 bends at the various ridges and valleys and is restored during the straight flights of the belt by the resilience of the foam or sponge layers. The outer layers 10 and 14 readily contract to permit this bending of the belt. If the outer layers are creped the bending characteristics are improved.

In the embodiment of Figs. 3 and 4 the various layers are arranged as in Figs. 1 and 2 except that the intermediate layer 11a of Figs. 3 and 4 is knurled or patterned to provide spaced embossed shapes shown as pyramid-shaped bosses 40 having holes 41 at their apexes for the passage of the bonding agent. The pyramids 40 are shown as aligned longitudinally of the web 11a so as to provide channels 42 in which the reinforcing cords 23 lie. the lower reinforcing cords 22 may be omitted if desired to allow the web 11a to contact the web 10 at the bottoms of the channels 42.

The use of separated, patterned pyramids 40 in place of the transverse corrugations of the web 11 of Figs. 1 and 2 provides increased flexibility, both longitudinal and transverse, and also permits the web 11a to contact the outer webs 10 and 14 for improving the bond.

The embodiment shown in Figs. 5 and 6 is similar to that of Figs. 1 and 2 except that the inner web 11b is fluted in the form of a sine wave and a coating 45 of rubber or the like is disposed on the upper web 14. The coating 45 may be composed of sponge or foam rubber or polyurethane and may be cured or vulcanized to provide a soft surface for protecting the conveyor and for preventing damage to articles conveyed.

Fig. 7 illustrates a multi-layer belting formed of a plurality of layers 46 of flat or creped paper-like material with alternate layers 47 of fluted or crimped sheets of paper-like material and interleaved reinforcing cords 22 and 23, with the various layers or sheets bonded by a bonding agent 49 of the type above described. Obviously, the belting can be built up to the desired thickness in this manner, depending upon the strength and stiffness required.

Fig. 8 illustrates an embodiment wherein the sponge or foam is omitted and the various webs and reinforcing cords are bonded and reinforced by a coating 50 on one or both faces of each web. The coating 50 may comprise a flexible resin such as polyethylene which imparts a substantial tear strength to the webs and bends the contiguous webs together.

In this form air spaces are formed by the crimped or fluted web. The lightness and flexibility of this form of belting makes it suitable for various special light duty uses.

The belting may be made in the required width or may be made in the form of a wide web and slit to the desired width for use.

What is claimed is:

1. A non-woven composite belting comprising a center web of non-woven paper material having transverse corrugations adapted to impart increased overall thickness and flexibility, a pair of webs of non-woven paper material disposed respectively on opposite sides of said first web and spaced therefrom, a sponge rubber material filling the spaces between said webs and bonding said webs together into a unitary structure, parallel yarns having a dimensional stability at least as great as that of said paper embedded in said sponge rubber material between adjacent webs and extending longitudinally of said belt for imparting improved tensile strength thereto.

2. A belt as set forth in claim 1 in which said sponge rubber material is polyurethane.

3. A non-woven composite belting comprising a center web of non-woven paper material having spaced embossed shapes formed therein and arranged in longitudinal alignment to form continuous longitudinal channels therebetween, a pair of webs of non-woven paper material disposed respectively on opposite sides of said first web and spaced therefrom, a sponge rubber material filling the spaces between said webs and bonding said webs together into a unitary structure, and parallel yarns having a dimensional stability at least as great as that of said paper embedded in said sponge rubber material and extending longitudinally in said channels for imparting improved tensile strength to said belt.

References Cited in the file of this patent

UNITED STATES PATENTS

| | | |
|---|---|---|
| 969,460 | Chartener | Sept. 6, 1910 |
| 1,158,667 | Fairchild | Nov. 2, 1915 |
| 1,425,914 | Swift | Aug. 15, 1922 |
| 1,605,953 | Howard | Nov. 9, 1926 |
| 1,926,156 | Lormor | Sept. 12, 1933 |
| 1,958,050 | Koppelman | May 8, 1934 |
| 2,004,935 | Dorn | June 18, 1935 |
| 2,198,392 | Rowe | Apr. 23, 1940 |
| 2,607,104 | Foster | Aug. 19, 1952 |
| 2,737,227 | Brummel | Mar. 6, 1956 |

FOREIGN PATENTS

| | | |
|---|---|---|
| 416,830 | Great Britain | Sept. 1, 1934 |
| 328,724 | Italy | Aug. 19, 1935 |
| 167,675 | Australia | July 23, 1953 |
| 704,186 | Great Britain | Feb. 17, 1954 |
| 758,974 | Great Britain | Oct. 10, 1956 |